United States Patent Office 3,526,045
Patented Sept. 1, 1970

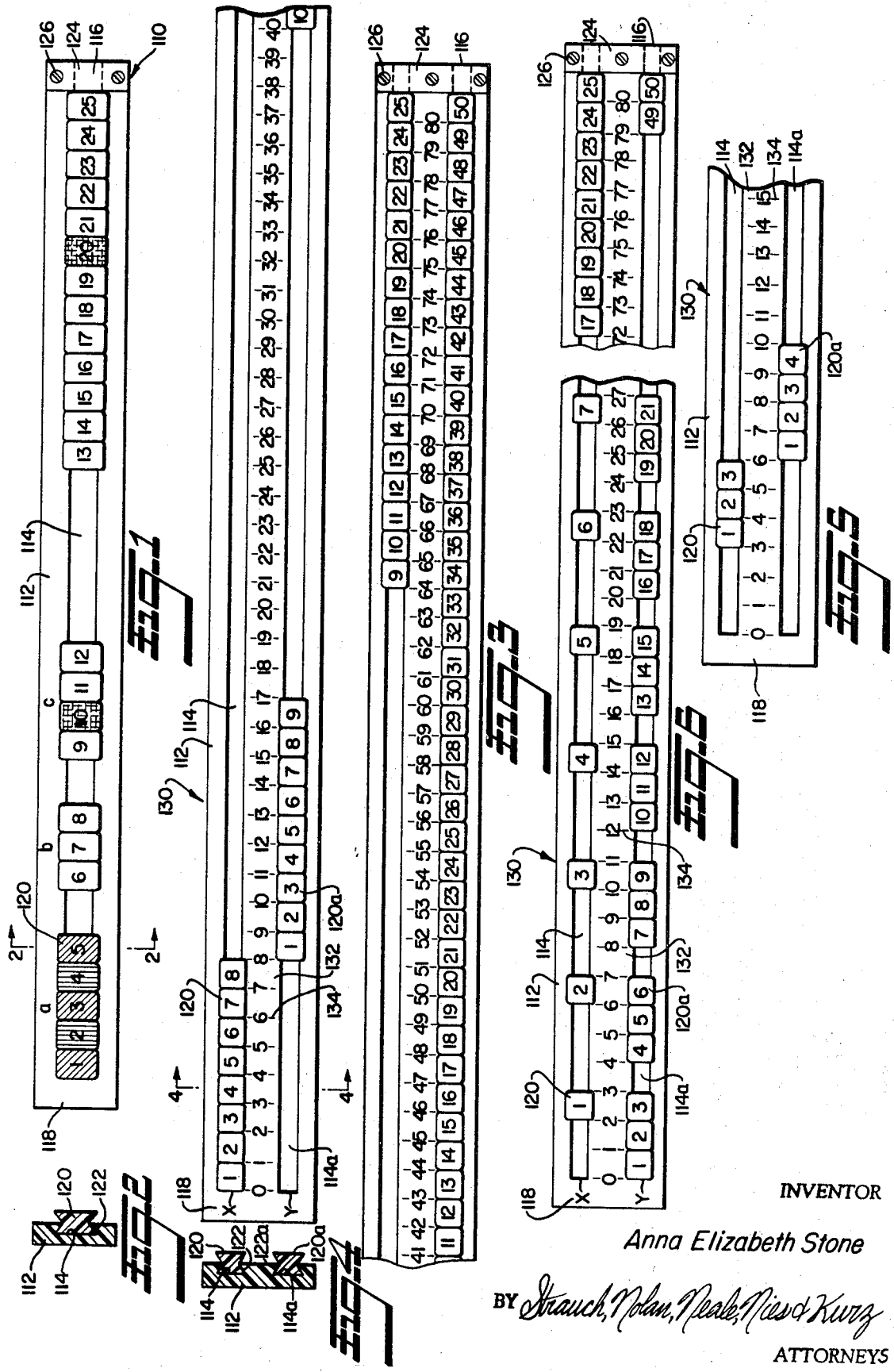

3,526,045
SEGMENTED MOVABLE NUMBER LINE AND
METHOD OF USE
Anna Elizabeth Stone, R.D. 3 N. Plank Road,
Newburgh, N.Y. 12550
Filed Dec. 26, 1967, Ser. No. 693,562
Int. Cl. G09b *19/02*
U.S. Cl. 35—31                                          6 Claims

ABSTRACT OF THE DISCLOSURE

A segmented movable number line including a plurality of counters each independently slidably mounted on a frame and a number marking on each of the counters, the numbers on successively adjacent counters forming a progressive number series. A calculator incorporates a plurality of movable number lines arranged in a manner which clearly demonstrates abstract number concepts through the manipulation of the movable counters in the various number lines. The calculator may also include conventional fixed number lines useful with the movable number line in addition and subtraction processes.

BACKGROUND OF INVENTION

This invention relates generally to teaching aids or tools, such as number lines and abacuses, and more particularly to a novel segmented movable number line and a calculating device incorporating the number line, each of which combines the manipulating characteristics of the abacus or counting frame with the advantages of a traditional number line, thus enabling a wide range of basic number concepts and arithmetical operations to be clearly introduced and demonstrated to children.

In recent years the use of teaching aids and tools in the field of education has become increasingly popular. Educators have found that children are better able to grasp and learn abstract arithmetical number concepts if these numbers are related to physical entities which are readily identified and understood by children through the natural senses of sight and touch.

The subject of arithmetic is now commonly presented with the aid of the conventional number line and the abacus, the former merely consisting of a fixed scale having spaces marked off by lines or dots which are numbered. However, reading a scale is a more sophisticated procedure than that of relating counting numbers to objects, hence children using the conventional number line have become confused and do not obtain a correct understanding of numbers as they tend to associate the numeral on the number line with the line or dot dividing the spaces, rather than with a space itself. For example, in substracting 5 from 8 (8—5), a child will begin at the line marked by the numeral 8 and count backwards one, two, three, four, five, and then wonder why four is not the correct answer. Additionally, the ordinary number line must be used with a blackboard, or other device, to indicate operations usually by drawing lines or directional arrows.

The typical abacus merely includes a group of objects which may be manipulated by a child, but it does not enable a child to clearly visualize number concepts through the combined phenomena of sight, touch, and speech, and thus has not been entirely satisfactory.

Prior art attempts to improve the conventional number line have been somewhat successful, but have also had their disadvantages and have been limited in application. U.S. Pat. No. 1,165,058 illustrates a teaching device having an upper member scaled from zero to any desired number and a lower member scaled from one to ten, with the lower member slidably movable relative to the upper. This device is limited, however, to operations of addition and subtraction. U.S. Pat. No. 3,147,556 illustrates a somewhat more sophisticated calculating device combining fixed scales with movable scales, the latter containing numerals in groups of ten. This calculator permits addition, subtraction, multiplication and division, but is also limited in that it does not provide for individual number groupings by twos, threes, fours, etc. and does not enable a child to associated a single number with a single physical object. The child must still refer to the line markings on the fixed and movable scales.

SUMMARY OF THE INVENTION

The primary object of this invention is to provide a novel segmented movable number line which clearly demonstrates number concepts by relating a single number to a single phyiscal counter. In this regard, the novel number line enables a properly instructed child to simultaneously move a counter while saying the number which he sees written on the counter, and thus by associating abstract numbers with physical entities, permits the child to visualize in a concrete manner concepts which previously had been too abstract for understanding.

Another object is to provide a novel segmented movable number line and method of use which assists a child in learning addition and subtraction by associating individual numbers with single physical objects, thus eliminating the common bad habit of referring to his fingers.

Still another object is to provide a novel segmented movable number line comprising a frame and individual movable counters, each marked with a number and slidably contained within the frame.

A further object is to provide a novel calculating device incorporating the novel segmented movable number line and capable of performing a wide range of arithmetical operations including addition, subtraction, multiplication, division, factoring, fractions and others, and demonstrating the properties of commutativity and associativity in a graphically illustrated manner clearly understood by children.

A still further object is to provide a novel, self contained, calculating device incorporating a plurality of segmented movable number lines, the movable counters in the various number lines being manipulatable to illustrate various number concepts and to perform various arithmetical operations. Conventional fixed number lines may also be provided on the calculator device for use in addition and subtraction processes.

Another object is to provide a novel calculating device incorporating a plurality of movable segmented number lines which may be used to demonstrate clearly the inverse relationship of addition to subtraction and multiplication to division. Also in this regard addition and subtraction may be taught together in a single operation and multiplication and division in another single operation, thus reducing the total number of processes to be learned.

Other objects and novel features will become apparent from reading the appended claims and the following detailed description in connection with the drawings in which similar characters of reference represent corresponding parts in each of the several views.

BRIEF DESCRIPTION OF THE DRAWINGS

FIG. 1 is a top plan view of the novel segmented movable number line illustrating addition and subtraction operations;

FIG. 2 is a transverse sectional view along the line 2—2 of FIG. 1;

FIG. 3 is a top plan view in two parts of a novel calculating device embodying a plurality of segmented movable number lines used with a fixed number line and illustrating addition and substration operations;

FIG. 4 is a transverse sectional view along line 4—4 of FIG. 3;

FIG. 5 is a fragmental plan view of a calculator similar to FIG. 3, illustrating an addition process having three addends;

FIG. 6 is a plan view similar to FIG. 3, illustrating an arrangement of the counters in the movable number lines to perform multiplication, division, and fractioning operations.

DESCRIPTION OF PREFERRED EMBODIMENTS

Referring now to FIGS. 1 and 2, the novel segmented movable number line 110 comprises a generally rectangular frame 112 having a longitudinally extending recess 114 opened at end 116 but closed at end 118.

A plurality of individual segments or counters 120 of uniform width are received within recess 114 for independent sliding movement along frame 112, the movement being accomplished by any suitable connection means, e.g. dovetail connection 122 shown in FIG. 2 as formed by a first rear portion of counter 120 slidably received in recess 114, with a second front portion of the counter protruding outwardly from the recess to enable an operator to readily grasp the counter and manipulate it as desired. The number of counters provided are generally less than that required to completely fill recess 114 so that they may be freely moved relative to each other and grouped and regrouped in sets of varying numbers. The counters are normally retained within recess 114 by end retainer plate 124 secured to frame 112 by suitable screws 126. Counters 120 are successively numbered left to right to form a progressive number series from numeral 1 to any desired numeral, 25 being illustrated, depending upon the number of counters utilized, and may be grouped in any number of sets in which the number of counters in each set may be varied to perform any addition of subtraction operations.

The arrangement of the counters 120 shown in FIG. 1 illustrates a typical addition operation in which it is desired to add 5+3+4. The child merely arranges the counters from left to right so that set $a$ includes five counters, set $b$ includes three counters, and set $c$ includes four counters and then reads the numeral on the last counter in set $c$ to obtain the resulting sum of 12. The counters not in use are conveniently placed to the extreme right of the number line.

A subtraction operation is performed in a similar but reversed manner. A child wishing to subtract 12—4—3 starts with counter 12 and, moving right to left, arranges four counters in set $c$ and three in set $b$. He then reads the remainder on the next counter in set $a$ which is 5.

Referring now to FIGS. 3 and 4, another embodiment of the invention which serves as a calculator device 130 includes a generally rectangular frame 112 having parallel upper and lower movable number lines $x$ and $y$ formed by recesses 114, 114a respectively, each receiving a plurality of counters 120 and 120a, respectively, all of uniform width for sliding movement in the recesses by the tongue and groove connections shown in FIG. 4 and described previously with respect to FIG. 2. The frame portion 132 separating number lines $x$ and $y$ preferably serves as a fixed number line useful in addition and subtraction and is divided into a series of equidistantly spaced graduations 134, the spacings corresponding in width to that of counters 120, 120a and the graduations being numbered successively left to right from 0 to the end, the last graduation being numbered 80 in the lower section of the illustrated embodiment.

As in the embodiment of FIG. 1, the counters 120 and 120a are numbered successively left to right starting at numeral 1, the number of counters provided again being insufficient to completely fill recesses 114 and 114a to permit free relative movement of the counters. For example, as indicated by fixed number line 132 in FIG. 3, recesses 114 and 114a have sufficient length to receive eighty counters, however, only fifty counters are provided in lower recess 114a and twenty-five in upper recess 114 A lesser number of counters 120 are provided in the upper recess than counters 120a in the lower recess to permit a child to readily multiply, divide and fraction by using the movable upper and lower number lines together as will be hereinafter pointed out.

The calculator to FIG. 3 is highly versatile and is capable of performing a wide range of arithmetical operations in such a manner that the child at all times better associates a number with a written numeral, since he feels each counter as he moves it, he says the number marked on each respective counter, and he sees the written symbol as well. Thus, arithmetical concepts which previously were too abstract for children to grasp are presented by the invention in a concrete physical manner enabling the children to readily visualize and understand them.

ADDITION AND SUBTRACTION

Addition or subtraction may be performed on calculator 130 in several ways. Either the upper or lower movable number line may be used alone to add or subtract in the same manner described with respect to FIG. 1. Another way is to either one or both movable lines $x$ and $y$ with the fixed number line 132. For example, to add 8+9=17 the counters may be arranged from left to right as shown in FIG. 3 if the lines $x$ and $y$ are used, the sum 17 always being read on the fixed line 132. Similarly, if the fixed line 132 is used with one of the movable lines, the lower one $y$ being illustrated, the resulting sum 17 would be the same and again would appear on the fixed line. During this latter mode of operation, the counters of the movable line $x$ not being used are preferably displaced to the extreme right (not shown) to avoid confusion.

When adding three or more addends both movable lines $x$ and $y$ and the fixed line 132 may be used. As illustrated in FIGS. 5, in addition 3+3+4=10, the first addend is represented on line 132, the second and third addends on lines $x$ and $y$ respectively, with the sum 10 again being read on the fixed line 132.

Since subtraction is the reverse of addition, any of the above addition processes may be reversed to subtract. For example, with reference to FIG. 3 in subtracting 17—9=8, numeral 17 on fixed line 132 is the minuend, the nine movable counters 120a on the lower line $y$ represent the subtrahend 9, and, reading right to left, the remainder 8 is indicated on the fixed line 132. Similarly, referring to FIG. 5 and subtracting 10—4—3=3, minuend 10 is on fixed line 132. subtrahend 4 on lower line $y$, subtrahend 3 on upper line $x$, and remainder 3 on fixed line 132.

Is is evident that the use of my calculator permits addition and subtraction to be taught together in a single operation as just two ways of expressing one fact.

MULTIPLICATION AND DIVISION

To multiply or divide, only the upper and lower movable number lines $x$ and $y$ are used, the fixed line 132 serving no purpose. The use of the two movable lines clearly relates multiplication to addition and to the counting numbers in a realistic and visual manner.

To perform a multiplication operation the counters 120a in the bottom number line are grouped from left to right in sets of twos, threes, fours, etc. depending upon the particular multiplication table being taught. The counters 120 in the top number line are then used to number each of the sets so that the children recognize how many sets there are and which set is being discussed at a given time. FIG. 6 illustrates an arrangement for the 3 times multiplication table wherein the bottom counters 120a are grouped in threes and the top counters 120 are positioned over the last counter in each group and indicate the total number of groups or sets. To obtain the product of a number represented by a top counter 120, which is the multiplicand, multiplied by the number three, the multiplier, the child merely reads the product number on the counter 120a positioned below the respective multiplicand counter 120. For example, when multiplying 2×3=6, the child merely goes to the multiplicand 2 on the top line and reads down to the product 6 on the bottom line.

It is also apparent that with this calculator the child readily realizes the arithmetical relationship between addition and multiplication. In multiplying 2×3=6, he clearly visualizes the fact that he is merely determining the sum of two groups of counters 120a, each group comprising three counters, with the sum 6 being indicated on the last counter in the second group.

My invention also readily illustrates that division is the inverse of multiplication merely by reversing the above-described process with respect to FIG. 6 and using the counters 120a as the dividend, the number three as the divider, and the top counter 120 as the quotient.

This inverse relationship may be visually illustrated in another manner. Assume it is desired to show that 4×3=12 is the inverse of 12÷3=4. To do this, on one movable line a child sees that four groups of counters with three counters in each group require a total of twelve counters. Inversely on the other movable line, a child takes twelve counters and divides them into groups of three, thus giving him four groups. He then observes that both lines are identical.

To enable a child to clearly visualize that multiplication and division are merely inverse processes of each other is highly advantageous, since it permits both processes to be taught together and again reduces the total number of processes to be learned.

Various other properties of numbers and their functions, which, when understood, will reduce the number of facts to be memorized may also be clearly illustrated in a concrete manner by using my calculator 130. The property of communtativity is easily demonstated with the two parallel sets of movable counters in the upper and lower movable lines $x$ and $y$. For example, to show that 3+8=8+3 or 3+8=11 and 8+3=11, eleven counters on each line are used, the counters 120 on upper line $x$ being divided into sets of three and eight and counters 120a on the bottom line divided into sets of eight and three. The child reading the last counter to the right in each line readily visualizes and understands that in both instances the sum is 11.

In multiplication, the property of commutativity may be illustrated by showing that 3×4=4×3 or 3×4=12 and 4×3=12. To demonstrate this, twelve counters 120 on the top line may be divided into three sets of four counters each, and twelve counters 120a on the bottom line may be divided into four sets of three counters each, with the product 12 shown by the last counter to the right in each line to be the same in both examples.

The property of associativity as it applies to addition and multiplication is also easily and correctly demonstrated on my device. Thus, by appropriately arranging the counters 120 and 120a in the specified groups, the concept in addition that (3+4)+8=3+(4+8) and in multiplication that (2×3)×4=2×(3×4) are readily understood again by reading the last counter to the right.

My device also clearly demonstrates the process of factoring, i.e. finding all the numbers that will divide a given number evenly without a remainder. Using either the upper or lower movable line, this is done for any given number by taking a respective number of counters representing that number and dividing them into sets of twos, threes, fours, etc. until all the possibilities have been tried. Additionally, a necessary outgrowth of this factoring process is the discovery of prime numbers, i.e. those having no factors except one and the number itself since, for example only five groups of one counter each or one group of five counters would equal five.

Once a child has mastered the process of factoring and the resulting discovery of prime numbers, the calculator then becomes a very useful and simple tool in working with fractions. Mathematicians generally agree that fractions should be presented as a ratio and not just as part of the whole. The two parallel upper and lower number lines $x$ and $y$ may be used to represent any type of fraction, with the number of lower counters 120a being set equal to the denominator and upper counters 120 set equal to the numerator. With the counters arranged in this manner, the various number relationships can be explored. For example, the child may readily visualize and determine whether the fraction is a proper or improper one by counting the counters in the upper and lower lines. He may also determine whether the fraction may be reduced by finding a common factor for the numerator and denominator. Since he has already explored and mastered the process of factoring as discussed above, he will merely be applying a familiar concept while developing and learning the process of fractioning.

The devices illustrated in FIGS. 1 and 3 may be constructed of any suitable material such as plastic, wood, metal, cardboard, etc. sufficiently durable and rugged to withstand continued and extensive use and without danger of the loss counters.

The devices may also be constructed in various sizes. For example, a number line or calculator adapted for individual use at a child's desk may be about two feet long, while one intended for classroom illustration may be about fifteen feet long. In this same regard, the actual number of counters in each number line and the size of the counters may be varied as desired.

Also, a color scheme may be applied to the devices to distinguish even and odd numbers (see counters 1 through 5 FIG. 1 lined for green and red) and to accent certain numbers such as ten, twenty, etc. (see FIG. 1 counters 10 and 25 lined for yellow). This scheme will not affect the basic mechanical operation of the devices, but will increase their potential and may simplify their operation for some children.

In the calculator of FIGS. 3-6, the scaled number line 132 may simply comprise a scale or rule which is readily removable from frame 112, since it is only used in addition and subtraction processes. Furthermore, rather than having the counters 120 and 120a mounted in recesses 114 and 114a on frame 112, the calculator may simply be constructed by slidably connecting the upper and lower counters to a common intermediate longitudinally extending support element. Additionally, any number of fixed or movable lines may be provided on the calculator.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A segmented movable number line teaching aid comprising an elongated frame, a pair of parallel, longitudinally extending, movable number lines on said frame, each of said movable number lines formed by a plurality of equi-length counters and means slidably connecting said counters on said frame for longitudinal sliding movement therealong, each of said counters having a front indicating surface which is numbered for visual identification and is visible at all times during sliding movement of said counters, said counters in each of said number lines being serially numbered from 1 at a common end of said number lines to the other end thereof to form progressively numbered movable number lines, said number lines being closed at opposite ends thereof so that said counters are normally non-removably slidably supported in predetermined assembled relationship on said frame to provide a teaching aid which may be handled without loss or separation of said counters from said frame, whereby said movable number lines cooperate together to provide a teaching aid capable of directly visually displaying solutions to various arithmetical operations.

2. A segmented movable number line teaching aid as defined in claim 1, wherein the number of counters in one of said number lines is greater than the number in the other number line.

3. A segmented movable number line teaching aid as defined in claim 2, comprising a longitudinally extending frame panel area disposed between said parallel number lines, said panel area being serially numbered starting with zero at said common end and progressing in numerical succession at spaced intervals corresponding to the length of the respective counters to the other end to form a fixed number line intermediate said movable number lines.

4. A segmented movable number line teaching aid as defined in claim 1, said slidable connecting means including a dovetail fit between each of said counters and said frame.

5. A segmented movable number line teaching aid as defined in claim 4, said frame comprising a pair of parallel longitudinally extending recesses in which said counters are slidably mounted to form said movable number lines, each of said counters having a first portion forming a dovetail fit with its respective recess and a second portion on which said numbered indicating surface is formed protruding outwardly from said recess so that said counters may be readily grasped for manipulation thereof.

6. The segmented movable number line teaching aid of claim 2 wherein the odd numbered and even numbered counters in at least one of said movable number lines are respectively distinctively colored to demonstrate the concept of odd and even numbers.

References Cited

UNITED STATES PATENTS

| | | |
|---|---|---|
| 973,905 | 10/1910 | Alexander. |
| 2,764,822 | 10/1956 | Gurevitch _____ 35—33 |

FOREIGN PATENTS

| | | |
|---|---|---|
| 1,117,951 | 3/1956 | France. |
| 826,648 | 1/1952 | Germany. |

WILLIAM H. GRIEB, Primary Examiner